United States Patent
Chen et al.

(10) Patent No.: US 12,308,704 B2
(45) Date of Patent: May 20, 2025

(54) ROTOR ASSEMBLY AND ALTERNATING-POLE MOTOR

(71) Applicant: GREE ELECTRIC APPLIANCES, INC. OF ZHUHAI, Zhuhai (CN)

(72) Inventors: Bin Chen, Zhuhai (CN); Quanfeng Li, Zhuhai (CN); Yong Xiao, Zhuhai (CN); Jiating Ding, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 446 days.

(21) Appl. No.: 17/576,003

(22) Filed: Jan. 14, 2022

(65) Prior Publication Data
US 2022/0140679 A1 May 5, 2022

Related U.S. Application Data

(63) Continuation of application No. PCT/CN2020/097586, filed on Jun. 23, 2020.

(30) Foreign Application Priority Data

Aug. 2, 2019 (CN) .......................... 201910713441.9

(51) Int. Cl.
*H02K 1/276* (2022.01)
(52) U.S. Cl.
CPC ........ *H02K 1/2773* (2013.01); *H02K 2213/03* (2013.01)
(58) Field of Classification Search
CPC ............. H02K 1/2773; H02K 2213/03; H02K 1/2746; H02K 29/03; H02K 1/276; H02K 21/028
See application file for complete search history.

(56) References Cited

U.S. PATENT DOCUMENTS

2019/0356185 A1* 11/2019 Yabe .................. F04D 13/06
2019/0379248 A1* 12/2019 Yoon .................. H02K 1/2706

FOREIGN PATENT DOCUMENTS

| CN | 102939699 A | 2/2013 |
| CN | 203219023 U | 9/2013 |

(Continued)

OTHER PUBLICATIONS

Extended European Search Report issued in counterpart European Patent Application No. 20850654.3, dated Sep. 8, 2022.

(Continued)

*Primary Examiner* — Christopher M Koehler
*Assistant Examiner* — Riley Owen Stout
(74) *Attorney, Agent, or Firm* — Westbridge IP LLC (57) ABSTRACT

Disclosed are a rotor assembly and an alternating-pole motor. The rotor assembly includes a rotor core including permanent magnetic poles and alternating poles that are arranged alternately in a circumferential direction, each permanent magnetic pole includes a mounting groove, a permanent magnet is mounted in the mounting groove, polarities of the permanent magnets facing an outer periphery of the rotor core are the same, both ends of the mounting groove are respectively provided with a second air slot, the second air slot includes a slot body and a first extension part and a second extension part that are extended from the slot body to a center line of a magnetic pole, and the first extension part and the second extension part are sequentially disposed to form a stepped slot with a decreasing radial thickness.

18 Claims, 5 Drawing Sheets

(56) References Cited

FOREIGN PATENT DOCUMENTS

| | | |
|---|---|---|
| CN | 107196434 A | 9/2017 |
| CN | 207442555 U | 6/2018 |
| CN | 108768023 A | 11/2018 |
| CN | 208190372 U | 12/2018 |
| CN | 110401283 A | 11/2019 |
| CN | 209948818 U | 1/2020 |
| DE | 102013110141 A1 | 3/2014 |
| EP | 1965484 A1 | 9/2008 |
| EP | 3598619 A1 | 1/2020 |
| JP | H07336917 A | 12/1995 |
| JP | 2004350345 A | 12/2004 |
| JP | 2007174738 A | 7/2007 |
| JP | 2013094041 A | 5/2013 |
| WO | 2014117575 A1 | 8/2014 |
| WO | 2018142444 A1 | 8/2018 |
| WO | 2018233253 A1 | 12/2018 |

OTHER PUBLICATIONS

Notice of Reasons for Refusal issued in counterpart Japanese Patent Application No. 2021-572955, dated Nov. 21, 2022.
Decision to Grant Patent issued in counterpart Japanese Patent Application No. 2021-572955, dated May 30, 2023.
International Search Report issued in corresponding PCT Application No. PCT/CN2020/097586, dated Sep. 25, 2020.
Si et al., Optimal design of an interior permanent magnet synchronous motor with a spliced type rotor, Electric Machines and Control, pp. 62-71, vol. 21, No. 8, dated Aug. 31, 2017.
Written Opinion issued in corresponding PCT Application No. PCT/CN2020/097586, dated Sep. 25, 2020.

* cited by examiner

ROTOR ASSEMBLY AND ALTERNATING-POLE MOTOR

CROSS-REFERENCE TO RELATED APPLICATIONS

This application is a continuation of International Application No. PCT/CN2020/097586 filed on Jun. 23, 2020, which claims priority to Chinese Patent Application 201910713441.9, filed on Aug. 2, 2019. Both applications are incorporated herein by reference in their entireties.

TECHNICAL FIELD

The present disclosure relates to the field of motor technologies, and in particular, to a rotor assembly and an alternating-pole motor.

BACKGROUND

The number of permanent magnets used in an alternating-pole permanent magnet synchronous motor is only half of the number of permanent magnets in a traditional permanent magnet synchronous motor, so that the alternating-pole permanent magnet synchronous motor makes full use of permanent magnets, and a usage amount of permanent magnets is significantly reduced, thereby reducing costs of the motor.

However, a special magnetic circuit structure of the alternating-pole permanent magnet synchronous motor also brings many problems, including a decrease in output torque caused by a decrease in the usage amount of permanent magnets and an increase in a torque ripple caused by asymmetry of adjacent magnetic pole structures, which limits further promotion and application of alternating-pole motors.

For some alternating-pole motors in the related art, the torque ripple is improved by optimizing a pole-arc coefficient, mainly aiming at a torque ripple caused by a cogging torque. However, there is no effect on a torque ripple caused by non-sinusoidal back electromotive force (back-EMF). Consequently, the effect is not good for an increase of a torque ripple caused by an abundant harmonic content of back-EMF of the alternating-pole motors.

SUMMARY

The present disclosure provides a rotor assembly, including a rotor core. The rotor core includes permanent magnetic poles and alternating poles that are arranged alternately in a circumferential direction. Each permanent magnetic pole includes a mounting groove, a permanent magnet is mounted in the mounting groove, and polarities of permanent magnets facing an outer periphery of the rotor core are the same. Both ends of the mounting groove are respectively provided with a second air slot, and the second air slot includes a slot body and a first extension part and a second extension part that are extended from the slot body to a center line of a magnetic pole. The first extension part and the second extension part are sequentially disposed to form a stepped slot with a decreasing radial thickness.

In some embodiments, the first extension part and the second extension part are disposed on one side, close to the outer periphery of the rotor core, of the slot body.

In some embodiments, a first air slot is disposed on the center line of the magnetic pole, and a distance between the second air slot and the outer periphery of the rotor core is less than a distance between the first air slot and the outer periphery of the rotor core.

In some embodiments, an included angle formed by side walls, close to the center line of the magnetic pole, of two first extension parts located on a same permanent magnetic pole is a21, an included angle formed by side walls, close to the center line of the magnetic pole, of two second extension parts located on a same permanent magnetic pole is a22, and a value of a22/a21 ranges from 0.7 to 0.9.

In some embodiments, an included angle formed by side walls, close to the center line of the magnetic pole, of two second extension parts located on a same permanent magnetic pole is a22, an included angle formed by side walls, close to a center line of an alternating pole, of two second air slots located on two sides of the alternating pole is a2, and a value of a22/a2 ranges from 0.7 to 1.

In some embodiments, in a plane perpendicular to a central axis of the rotor core, an included angle formed by side walls, close to the center line of the magnetic pole, of two second extension parts located on a same permanent magnetic pole is a22, an included angle formed by lines connecting two endpoints on a radial outer edge of the permanent magnet and a center of the rotor core is am, and a value of a22/am ranges from 0.65 to 0.75.

In some embodiments, a radial thickness of the first extension part is t21, a radial thickness of the second extension part is t22, and a value of t21/t22 t22/t21 ranges from 0.4 to 0.6.

In some embodiments, in a plane perpendicular to a central axis of the rotor core, an included angle formed by lines connecting two endpoints on a radial outer edge of the first air slot and a center of the rotor core is a1, an included angle formed by side walls, close to the center line of the magnetic pole, of two second extension parts located on a same permanent magnetic pole is a22, and a value of a1/a22 ranges from 0.1 to 0.15.

In some embodiments, a radial thickness of the first air slot is t1, a thickness of a pole shoe on the center line of the magnetic pole is ts1, and a value of t1/ts1 ranges from 0.4 to 0.6.

In some embodiments, a radial thickness of the second air slot is t2, a radial thickness of the first extension part is t21, and a value of t21/t2 ranges from 0.2 to 0.4.

In some embodiments, the first air slot is symmetrical about the center line of the magnetic pole.

According to another aspect of the present disclosure, an alternating-pole motor is provided, including a rotor assembly and a stator assembly. The rotor assembly is the foregoing rotor assembly.

The present disclosure provides a rotor assembly, including a rotor core. The rotor core includes permanent magnetic poles and alternating poles that are arranged alternately in a circumferential direction. Each permanent magnetic pole includes a mounting groove, a permanent magnet is mounted in the mounting groove, and polarities of permanent magnets facing an outer periphery of the rotor core are the same. Both ends of the mounting groove are respectively provided with a second air slot, and the second air slot includes a slot body and a first extension part and a second extension part that are extended from the slot body to a center line of a magnetic pole. The first extension part and the second extension part are sequentially disposed to form a stepped slot with a decreasing radial thickness. The rotor core of the rotor assembly is provided with a second air slot, and the second air slot includes a first extension part and a second extension part that are extended toward a center line of a magnetic pole, and the first extension part and the second extension part form a stepped slot with an unequal thickness, making the extension part thinner at a position close to the center line of the magnetic pole. At a position where back-EMF is close to a peak, part of a trough is lifted, and part of the peak is lowered, so that left and right sides of a back-EMF waveform is more symmetrical, and an even-order harmonic content is reduced, thereby resolving a problem of an increase in a torque ripple caused by back-EMF harmonic of an alternating-pole motor, significantly reducing a back-EMF harmonic content, reducing a back-EMF harmonic distortion rate, and improving performance of the motor.

DETAILED DESCRIPTION OF THE EMBODIMENTS

In combination with FIG. 1 to FIG. 11, according to an embodiment of the present disclosure, a rotor assembly includes a rotor core 1. The rotor core 1 includes permanent magnetic poles and alternating poles that are arranged alternately in a circumferential direction. Each permanent magnetic pole includes a mounting groove 2, a permanent magnet 3 is mounted in the mounting groove 2, and polarities of the permanent magnets 3 facing an outer periphery of the rotor core 1 are the same. Both ends of the mounting groove 2 are respectively provided with a second air slot 5, and the second air slot 5 includes a slot body and a first extension part 6 and a second extension part 7 that are extended from the slot body to a center line of a magnetic pole. The first extension part 6 and the second extension part 7 are sequentially disposed to form a stepped slot with a decreasing radial thickness.

The rotor core 1 of the rotor assembly is provided with a second air slot 5, and the second air slot 5 includes a first extension part 6 and a second extension part 7 that are extended toward a center line of a magnetic pole, and the first extension part 6 and the second extension part 7 form a stepped slot with an unequal thickness, making the extension part thinner at a position close to the center line of the magnetic pole. At a position where back-EMF is close to a peak, part of a trough is lifted, and part of the peak is lowered, so that left and right sides of a back-EMF waveform is more symmetrical, and an even-order harmonic content is reduced, thereby resolving a problem of an increase in a torque ripple caused by back-EMF harmonic of an alternating-pole motor, significantly reducing a back-EMF harmonic content, reducing a back-EMF harmonic distortion rate, and improving performance of the motor.

In some embodiments, two second air slots 5 are symmetrical about a center line of a magnetic pole, and an extension part of the second air slot 5 is extended toward the center line of the magnetic pole. Air gap magnetic density on an alternating pole and a permanent magnetic pole is adjusted to make adjacent air gap magnetic density more symmetrical, reducing a torque ripple.

Figure 7:
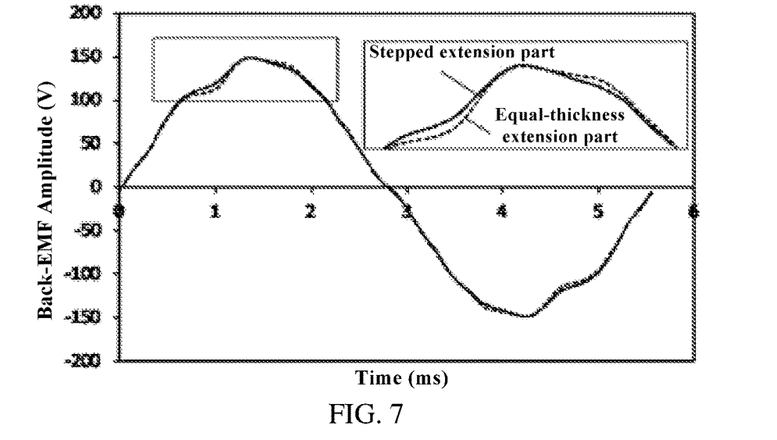
FIG. 7 is a diagram of comparison of back-EMF waveforms of extension parts in different forms.
Figure 8:
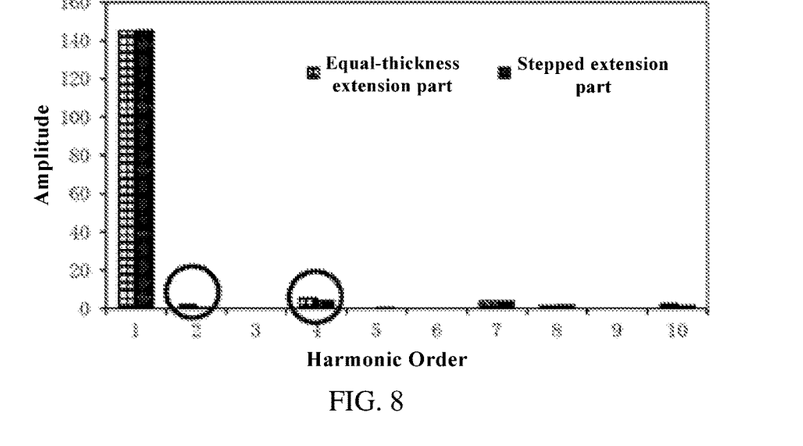
FIG. 8 is a diagram of comparison of back-EMF harmonic decomposition of extension parts in different forms.

The extension part in a solution of the present disclosure is thinner at a position close to the center line of the magnetic pole. Distribution of magnetic lines of force in the related art and that in the present disclosure are respectively shown by lines with dots in FIG. 5 and FIG. 6. Compared with a structure in which three magnetic lines of force pass through an extension part in the related art, in the solution of the present disclosure, four magnetic lines of force pass through the extension part. There is one more magnetic line of force passing through a position close to the center line of the magnetic pole, that is, there is more than a quarter of lines, which is shown in FIG. 7 by the waveform of back-EMF. At a position where the back-EMF is close to a peak, part of a trough in the related art is lifted, and part of the peak is lowered, so that left and right sides of a back-EMF waveform is more symmetrical, and an even-order harmonic content is reduced. As shown in FIG. 8, contents of the 2nd harmonic and the 4th harmonic are further reduced, and a back-EMF harmonic distortion rate can be further reduced compared to that in the related art.

In some embodiments, the first extension part 6 and the second extension part 7 are disposed on one side, close to the outer periphery of the rotor core 1, of the slot body, to effectively adjust magnetic lines of force.

A first air slot 4 is disposed on the center line of the magnetic pole, and a distance between the second air slot 5 and the outer periphery of the rotor core 1 is less than a distance between the first air slot 4 and the outer periphery of the rotor core 1.

Figure 1:
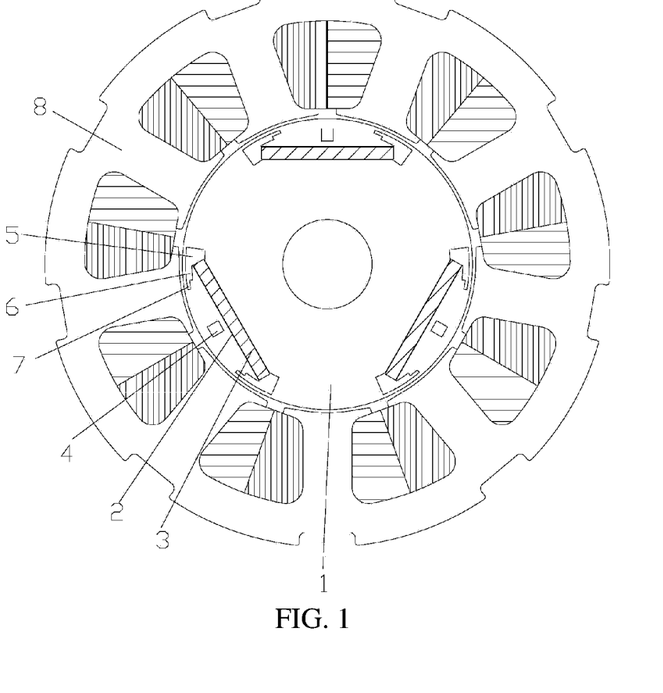
FIG. 1 is a schematic structural diagram of a rotor assembly according to an embodiment of the present disclosure.
Figure 2:
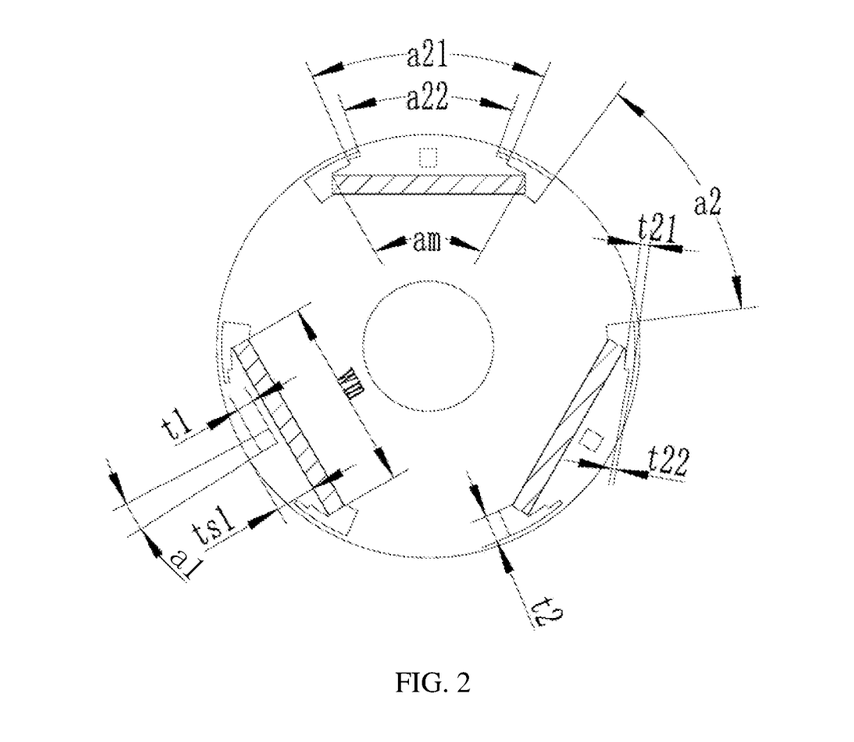
FIG. 2 is a dimensional structure diagram of a rotor assembly according to an embodiment of the present disclosure.
Figure 3:
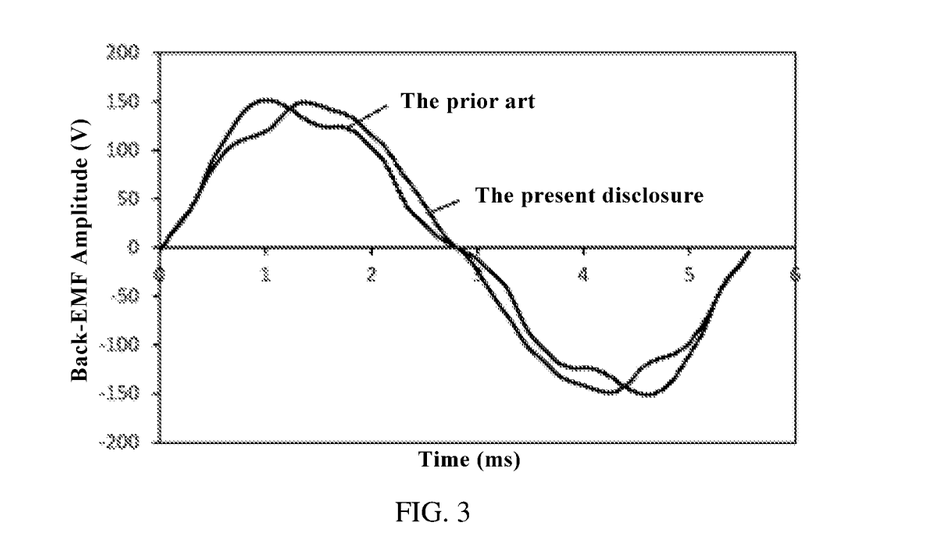
FIG. 3 is a diagram of comparison between a back-EMF waveform of a rotor assembly according to an embodiment of the present disclosure and that of a rotor assembly in the related art.
Figure 4:
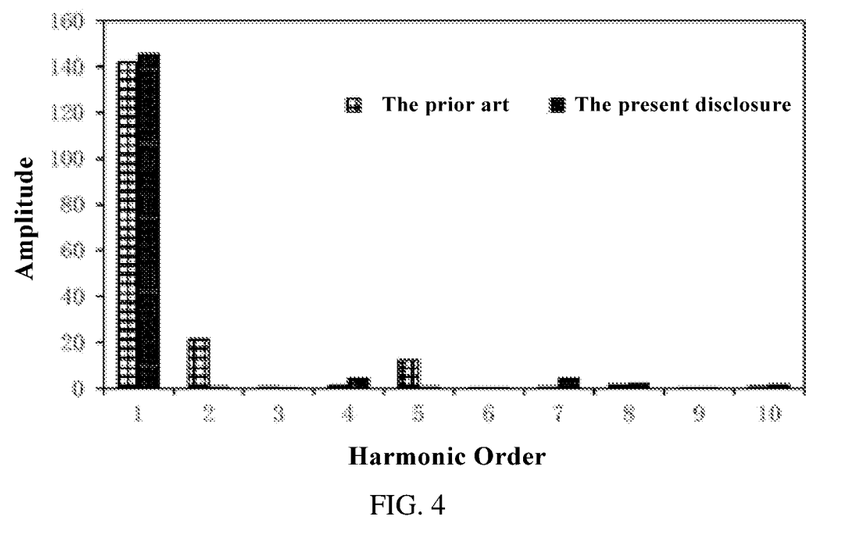
FIG. 4 is a diagram of comparison between back-EMF harmonic decomposition of a rotor assembly according to an embodiment of the present disclosure and that of a rotor assembly in the related art.
Figure 5:
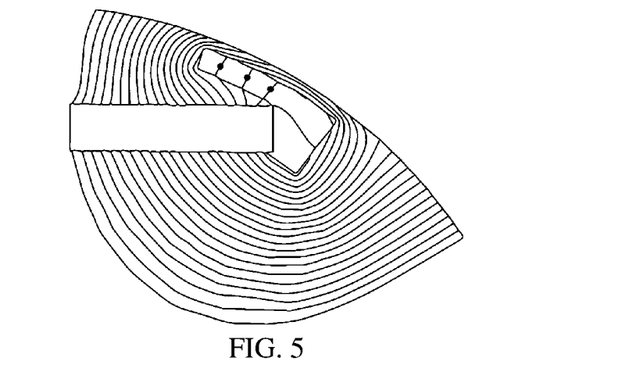
FIG. 5 is a distribution diagram of magnetic lines of force near an equal-thickness extension part of a rotor assembly.
Figure 6:
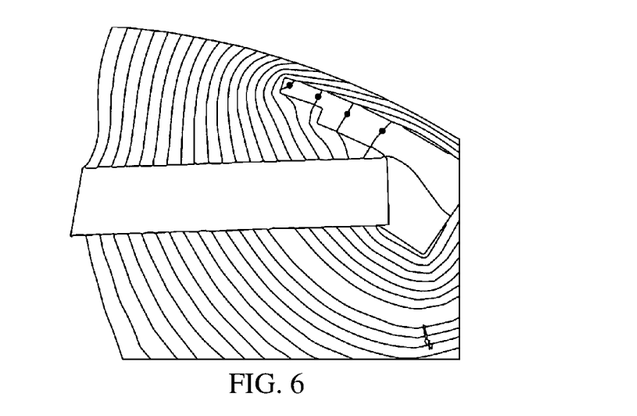
FIG. 6 is a distribution diagram of magnetic lines of force near a stepped extension part of a rotor assembly according to an embodiment of the present disclosure.

The first air slot 4 is configured to prevent the magnetic lines of force at the center of the magnetic pole from being too concentrated, and weaken a larger magnetic density peak, so that air gap magnetic density waveforms on adjacent magnetic poles are more symmetrical, and a sine degree of the magnetic density waveforms is better, as shown in FIG. 3. An even-order back-EMF harmonic caused by asymmetry of magnetic poles in the back-EMF harmonic is substantially attenuated, as shown in FIG. 4, and a torque ripple is further reduced compared to those in the related art.

An included angle formed by side walls, close to the center line of the magnetic pole, of two first extension parts 6 located on a same permanent magnetic pole is a21, an included angle formed by side walls, close to the center line of the magnetic pole, of two second extension parts 7 located on a same permanent magnetic pole is a22, and a value of a22/a21 ranges from 0.7 to 0.9. In this embodiment, planes where the side walls, close to the center line of the magnetic pole, of the two first extension parts 6 are respectively located pass through a central axis of the rotor core 1, that is, the central axis of the rotor core 1 lies in the planes.

Figure 9:
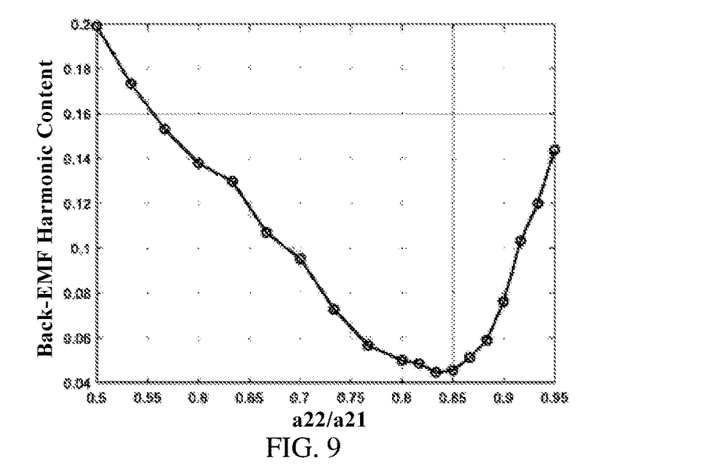
FIG. 9 is a diagram of a curve showing variation of a back-EMF harmonic content of a rotor assembly according to an embodiment of the present disclosure with a22/a21.

The smaller a ratio of the two included angles, the longer a thinner extension part, and the weaker a limiting effect on the magnetic lines of force at the center of the magnetic pole, so that the magnetic lines of force cannot be gathered on the permanent magnetic pole. On the contrary, the larger the ratio of the two included angles, the shorter the thinner extension part. The extension part gradually evolves into an equal-thickness extension part. As shown in FIG. 8, the even-order back-EMF harmonic content is increased. Research shows that when a22/a21 ranges from 0.7 to 0.9, the back-EMF harmonic content is relatively low, as shown in FIG. 9.

An included angle formed by side walls, close to the center line of the magnetic pole, of two second extension parts 7 located on a same permanent magnetic pole is a22, an included angle formed by side walls, close to a center line of an alternating pole, of two second air slots 5 located on two sides of the alternating pole is a2, and a value of a22/a2 ranges from 0.7 to 1. In this embodiment, planes where the side walls of the two second extension parts 7 are respectively located pass through the central axis of the rotor core 1. When planes where the side walls of the two second extension parts 7 are respectively located do not pass through the central axis of the rotor core 1, the two second extension parts 7 need to meet the following condition: in a plane perpendicular to the central axis of the rotor core 1, an included angle formed by lines connecting the center of the rotor core 1 and endpoints, close to the center line of the magnetic pole, on radial outer edges of the two second extension parts 7 is a22. In this embodiment, planes where the side walls of the two second air slots 5 are respectively located also pass through the central axis of the rotor core 1.

The ratio represents a pole-arc ratio of adjacent magnetic poles. The smaller the ratio, the greater an amplitude of magnetic density on the permanent magnetic pole, the smaller the magnetic density of the alternating pole, and magnetic density asymmetry increases. On the contrary, the larger the ratio, the wider a width of a pole shoe on the permanent magnetic pole, the less restrictive effect on magnetic lines of force, and the less the magnetic density. The magnetic density on the alternating pole is larger, and the magnetic density asymmetry also increases. Research shows that the magnetic density symmetry is the best when a value of a22/a2 ranges from 0.7 to 1.

In a plane perpendicular to the central axis of the rotor core 1, an included angle formed by side walls, close to the center line of the magnetic pole, of two second extension parts 7 located on a same permanent magnetic pole is a22, an included angle formed by lines connecting the center of the rotor core 1 and two endpoints on a radial outer edge of the permanent magnet 3 is am, and a value of a22/am ranges from 0.65 to 0.75. If the ratio of the two included angles is too large, effective magnetic density on the permanent magnetic pole cannot be formed. If the ratio of the two included angles is too small, the extension parts block the magnetic lines of force too much, resulting in a low utilization rate of the permanent magnet 3. Research shows that an effect is best when a value of a22/am ranges from 0.6 to 0.8.

Figure 10:
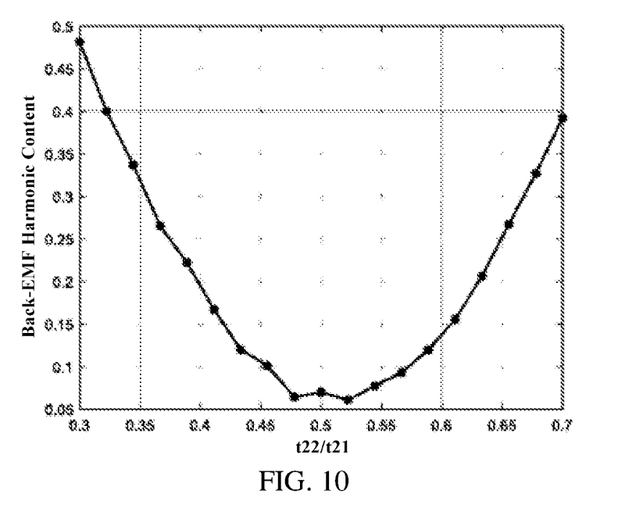
FIG. 10 is a diagram of a curve showing variation of a back-EMF harmonic content of a rotor assembly according to an embodiment of the present disclosure with t22/t21.

A radial thickness of the first extension part 6 is t21, a radial thickness of the second extension part 7 is t22, and a value of t22/t21 ranges from 0.4 to 0.6. The ratio represents a ratio of thicknesses of extension parts. If the ratio is too small, the second extension part 7 cannot effectively block passage of the magnetic lines of force, and thus a waveform of air gap magnetic density cannot be adjusted, while the first extension part 6 blocks the passage of the magnetic lines of force too much. On the contrary, if the ratio is too large, the second extension part 7 blocks the magnetic lines of force too much, resulting in a decrease in a utilization rate of the permanent magnet. In addition, more magnetic lines of force pass through the first extension part 6, resulting in greater magnetic flux leakage. Research shows that an effect is best when a value t22/t21 ranges from 0.4 to 0.6, as shown in FIG. 10.

Figure 11:
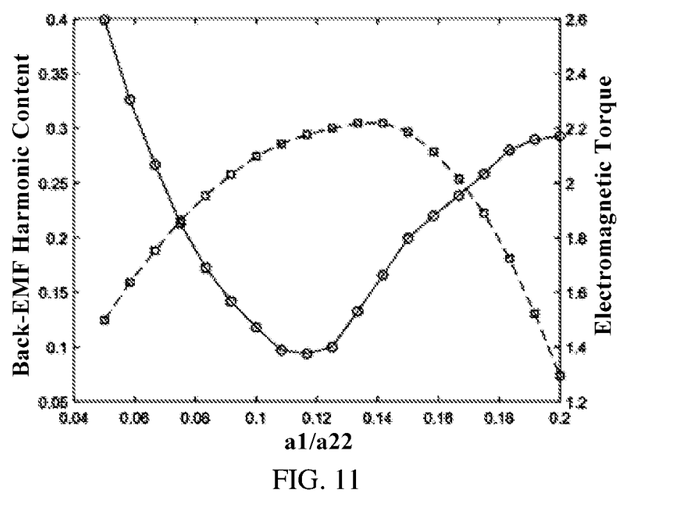
FIG. 11 is diagram of curves showing variations of a back-EMF harmonic content and an electromagnetic torque of a rotor assembly according to an embodiment of the present disclosure with a1/a22.

In a plane perpendicular to the central axis of the rotor core 1, an included angle formed by lines connecting the center of the rotor core 1 and two endpoints on a radial outer edge of the first air slot 4 is a1, an included angle formed by side walls, close to the center line of the magnetic pole, of two second extension parts 7 located on a same permanent magnetic pole is a22, and a value of a1/a22 ranges from 0.1 to 0.15. The ratio represents a proportion of a pole shoe occupied by the first air slot 4. The larger the ratio, the stronger an effective magnetic resistance formed by the first air slot 4, and the stronger an adjustment effect on the magnetic lines of force. However, if the ratio is too large, an electromagnetic torque decreases. On the contrary, when the ratio becomes smaller, the first air slot 4 is insufficient to form an effective magnetic resistance to adjust the magnetic lines of force and reduce a back-EMF harmonic distortion rate. Research shows that an effect is best when the ratio ranges from 0.1 to 0.15, as shown in FIG. 11.

A radial thickness of the first air slot 4 is t1, a thickness of a pole shoe on the center line of the magnetic pole is ts1, and a value of t1/ts1 ranges from 0.4 to 0.6. The ratio represents a radial space of the pole shoe occupied by the first air slot 4. The larger the ratio, the stronger a blocking effect on the magnetic lines of force. If the ratio is too large, an electromagnetic torque decreases. However, if the ratio is too small, the first air slot 4 cannot effectively modulate the magnetic lines of force. Research shows that an effect is best when a value of t1/ts1 ranges from 0.4 to 0.6.

A radial thickness of the second air slot 5 is t2, a radial thickness of the first extension part 6 is t21, and a value of t21/t2 ranges from 0.2 to 0.4. Distributions of magnetic lines of force on an alternating pole and a permanent magnet are inconsistent, and the magnetic lines of force on the alternating pole are more susceptible to an effect of armature reaction. Therefore, two sides of the second air slot 5 need to be provided with different thicknesses to modulate the magnetic lines of force. Research shows that a modulation effect on the magnetic lines of force is the best when a value of t21/t2 ranges from 0.2 to 0.4.

In some embodiments, the first air slot 4 is symmetrical about the center line of the magnetic pole, which further ensures uniformity of magnetic lines of force on both sides of the first air slot 4, making magnetic density of an entire air gap more sinusoidal.

The permanent magnet 3 is, for example, in a shape of a straight line.

The rotor core 1 is made of laminated soft magnetic material sheets, which helps magnetize the rotor core 1 with an alternating pole to show another polarity under an influence of a permanent magnetic pole.

According to an embodiment of the present disclosure, an alternating-pole motor includes a rotor assembly and a stator assembly 8, and the rotor assembly is the foregoing rotor assembly.

The alternating-pole motor, whose back-EMF harmonic decomposition diagram is shown in FIG. 4, designed according to the technical solution of the present disclosure has a lower harmonic content compared with that in the related art.

Those skilled in the art will readily appreciate that the foregoing technical features can be freely combined and superimposed on the premise of no conflict.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure. The foregoing descriptions are merely the preferred implementations of the present disclosure. It should only be noted that those of ordinary skill in the art may further make several improvements and variations without departing from the technical principles described in the present disclosure, and these improvements and variations also fall within the protection scope of the present disclosure.

What is claimed is:

1. A rotor assembly, comprising a rotor core, wherein the rotor core comprises permanent magnetic poles and alternating poles that are arranged alternately in a circumferential direction, each permanent magnetic pole comprises a mounting groove, a permanent magnet is mounted in the mounting groove, polarities of permanent magnets facing an outer periphery of the rotor core are the same, both ends of the mounting groove are respectively provided with a second air slot, the second air slot comprises a slot body and a first extension part and a second extension part that are extended from the slot body to a center line of a magnetic pole, and the first extension part and the second extension part are sequentially disposed to form a stepped slot with a decreasing radial thickness,
    wherein an included angle formed by side walls, close to the center line of the magnetic pole, of two first extension parts located on a same permanent magnetic pole is a21, an included angle formed by side walls, close to the center line of the magnetic pole, of two second extension parts located on a same permanent magnetic pole is a22, and a value of a22/a21 ranges from 0.7 to 0.9.

2. The rotor assembly according to claim 1, wherein the first extension part and the second extension part are disposed on one side, close to the outer periphery of the rotor core, of the slot body.

3. The rotor assembly according to claim 1, wherein a first air slot is disposed on the center line of the magnetic pole, and a distance between the second air slot and the outer periphery of the rotor core is less than a distance between the first air slot and the outer periphery of the rotor core.

4. The rotor assembly according to claim 3, wherein in a plane perpendicular to a central axis of the rotor core, an included angle formed by lines connecting two endpoints on a radial outer edge of the first air slot and a center of the rotor core is a1, an included angle formed by side walls, close to the center line of the magnetic pole, of two second extension parts located on a same permanent magnetic pole is a22, and a value of a1/a22 ranges from 0.1 to 0.15.

5. The rotor assembly according to claim 3, wherein a radial thickness of the first air slot is t1, a thickness of a pole shoe on the center line of the magnetic pole is ts1, and a value of t1/ts1 ranges from 0.4 to 0.6.

6. The rotor assembly according to claim 3, wherein the first air slot is symmetrical about the center line of the magnetic pole.

7. The rotor assembly according to claim 1, wherein an included angle formed by side walls, close to the center line of the magnetic pole, of two second extension parts located on a same permanent magnetic pole is a22, an included angle formed by side walls, close to a center line of an alternating pole, of two second air slots located on two sides of the alternating pole is a2, and a value of a22/a2 ranges from 0.7 to 1.

8. The rotor assembly according to claim 1, wherein in a plane perpendicular to a central axis of the rotor core, an included angle formed by side walls, close to the center line of the magnetic pole, of two second extension parts located on a same permanent magnetic pole is a22, an included angle formed by lines connecting two endpoints on a radial outer edge of the permanent magnet and a center of the rotor core is am, and a value of a22/am ranges from 0.65 to 0.75.

9. The rotor assembly according to claim 1, wherein a radial thickness of the first extension part is t21, a radial thickness of the second extension part is t22, and a value of t22/t21 ranges from 0.4 to 0.6.

10. The rotor assembly according to claim 1, wherein a radial thickness of the second air slot is t2, a radial thickness of the first extension part is t21, and a value of t21/t2 ranges from 0.2 to 0.4.

11. An alternating-pole motor, comprising a stator assembly and a rotor assembly, wherein the rotor assembly comprises a rotor core,
    the rotor core comprises permanent magnetic poles and alternating poles that are arranged alternately in a circumferential direction, each permanent magnetic pole comprises a mounting groove, a permanent magnet is mounted in the mounting groove, polarities of permanent magnets facing an outer periphery of the rotor core are the same, both ends of the mounting groove are respectively provided with a second air slot, the second air slot comprises a slot body and a first extension part and a second extension part that are extended from the slot body to a center line of a magnetic pole, and the first extension part and the second extension part are sequentially disposed to form a stepped slot with a decreasing radial thickness,
    wherein an included angle formed by side walls, close to the center line of the magnetic pole, of two first extension parts located on a same permanent magnetic pole is a21, an included angle formed by side walls, close to the center line of the magnetic pole, of two second extension parts located on a same permanent magnetic pole is a22, and a value of a22/a21 ranges from 0.7 to 0.9.

12. The alternating-pole motor according to claim 11, wherein the first extension part and the second extension part are disposed on one side, close to the outer periphery of the rotor core, of the slot body.

13. The alternating-pole motor according to claim 11, wherein a first air slot is disposed on the center line of the magnetic pole, and a distance between the second air slot and the outer periphery of the rotor core is less than a distance between the first air slot and the outer periphery of the rotor core.

14. The alternating-pole motor according to claim 13, wherein in a plane perpendicular to a central axis of the rotor core, an included angle formed by lines connecting two endpoints on a radial outer edge of the first air slot and a center of the rotor core is a1, an included angle formed by side walls, close to the center line of the magnetic pole, of two second extension parts located on a same permanent magnetic pole is a22, and a value of a1/a22 ranges from 0.1 to 0.15.

15. The alternating-pole motor according to claim 11, wherein an included angle formed by side walls, close to the center line of the magnetic pole, of two second extension parts located on a same permanent magnetic pole is a22, an included angle formed by side walls, close to a center line of an alternating pole, of two second air slots located on two sides of the alternating pole is a2, and a value of a22/a2 ranges from 0.7 to 1.

16. The alternating-pole motor according to claim 11, wherein in a plane perpendicular to a central axis of the rotor core, an included angle formed by side walls, close to the center line of the magnetic pole, of two second extension parts located on a same permanent magnetic pole is a22, an included angle formed by lines connecting two endpoints on a radial outer edge of the permanent magnet and a center of the rotor core is am, and a value of a22/am ranges from 0.65 to 0.75.

17. The alternating-pole motor according to claim 11, wherein a radial thickness of the first extension part is t21, a radial thickness of the second extension part is t22, and a value of t22/t21 ranges from 0.4 to 0.6.

18. The alternating-pole motor according to claim 11, wherein a radial thickness of the second air slot is t2, a radial thickness of the first extension part is t21, and a value of t21/t2 ranges from 0.2 to 0.4.

* * * * *